US007889862B2

(12) United States Patent
Dellow et al.

(10) Patent No.: US 7,889,862 B2
(45) Date of Patent: Feb. 15, 2011

(54) KEY UPDATE MECHANISM

(75) Inventors: Andrew Dellow, Gloucestershire (GB); Peter Bennett, Bristol (GB); Rodrigo Cordero, Bristol (GB)

(73) Assignee: STMicroelectronics Limited, Bristol (GB)

( * ) Notice: Subject to any disclaimer, the term of this patent is extended or adjusted under 35 U.S.C. 154(b) by 1156 days.

(21) Appl. No.: 11/523,775

(22) Filed: Sep. 18, 2006

(65) Prior Publication Data

US 2007/0124811 A1    May 31, 2007

Related U.S. Application Data

(63) Continuation of application No. PCT/GB2005/001025, filed on Mar. 18, 2005.

(30) Foreign Application Priority Data

Mar. 18, 2004   (EP) ................... 04251574

(51) Int. Cl.
*H04L 9/00*   (2006.01)
(52) U.S. Cl. .................... 380/44; 380/277; 713/189
(58) Field of Classification Search ......... 380/277–285, 380/44; 713/189, 190, 193
See application file for complete search history.

(56) References Cited

U.S. PATENT DOCUMENTS

| 5,812,446 | A | * | 9/1998 | Tailliet | .................. 365/185.04 |
| 5,845,332 | A | * | 12/1998 | Inoue et al. | .................. 711/163 |
| 6,034,889 | A | * | 3/2000 | Mani et al. | ............. 365/185.04 |
| 6,625,708 | B1 | * | 9/2003 | Lam | ........................... 711/170 |
| 7,434,069 | B2 | * | 10/2008 | Nessler | ....................... 713/193 |
| 7,466,821 | B2 | * | 12/2008 | Rhelimi et al. | ................. 380/44 |
| 2004/0136529 | A1 | | 7/2004 | Rhelimi et al. | |

FOREIGN PATENT DOCUMENTS

FR   2 822 565   9/2002

* cited by examiner

*Primary Examiner*—Kimyen Vu
*Assistant Examiner*—Randal D Moran
(74) *Attorney, Agent, or Firm*—Lisa K. Jorgenson; Jeremiah J. Baunach; Seed IP Law Group PLLC

(57) ABSTRACT

A memory stores data in an encrypted form. A modifiable register stores a memory address, $a_0$, defining a boundary separating the memory into two regions. The lower region stores data encrypted using a key B, and the upper region stores data encrypted using a different key A. Data stored on the boundary address is encrypted using key A. Accordingly, when data is read from a memory address a, key A is used to decrypt the data if $a \geq a_0$, and key B is used if $a < a_0$. However, when data is written to a memory address a, then key A is used to encrypt the data if $a \geq a_0+1$, key B is used if $a < a_0+1$. When data is written to the boundary address, $a_0$, the position of the boundary is caused to increase by one unit.

43 Claims, 2 Drawing Sheets

KEY UPDATE MECHANISM

BACKGROUND OF THE INVENTION

1. Field of the Invention

This invention relates to secure systems in which access to confidential data is restricted, including, but not limited to, pay-television.

2. Description of the Related Art

In secure systems, it is usually necessary that access to data of a confidential nature is restricted. Access to data in such systems is often restricted by encrypting or otherwise scrambling the data by means of particular secret keys. Data may then be accessed by authorized users by decrypting the data using a specified key known only to those users. Although such schemes provide a high degree of security, if the keys used to encrypt or decrypt data do become known to persons not entitled to access the data, then the system would be breached.

We have appreciated that the security of secure systems is increased if keys used to encrypt and decrypt confidential data are regularly updated. We have further appreciated that a reliable and efficient mechanism for updating keys is desirable.

BRIEF SUMMARY OF THE INVENTION

In an embodiment of the invention, a memory is provided to store data in an encrypted form. A modifiable register is arranged to store a memory address, $a_0$, defining a boundary separating the memory into two regions. The lower region stores data encrypted using a key B, and the upper region stores data encrypted using a different key A. Data stored on the boundary address is encrypted using key A. Accordingly, when data is read from a memory address a, key A is used to decrypt the data if $a \geq a_0$, and key B is used if $a < a_0$. However, when data is written to a memory address a, then key A is used to encrypt the data if $a \geq a_0+1$, key B is used if $a < a_0+1$. The value of $a_0$ is then incremented by one. In this way, when data is written to the boundary address, $a_0$, the position of the boundary is caused to increase by one unit.

Initially, the value of $a_0$ is set to zero so that all data within the memory is encrypted using key A. As data is written to the memory, particularly on the boundary address, the value of $a_0$ gradually increases. Eventually the value of $a_0$ will exceed the highest address of the memory. At this point, all data within the memory is encrypted using key B, and a new key is generated. The new key becomes key B, and key A takes the value of the old key B. The value of $a_0$ is then set back to zero and the process is repeated.

If a particular region of the memory is never written to, the value of $a_0$ will not increase beyond the lowest memory address of this region. To prevent this occurrence, if the value of $a_0$ does not change within a predetermined period of time then a 'kicker' process is activated. During the kicker process, data is caused to be read from the memory address $a_0$, and then to be written back to the same location, thereby artificially stimulating an increase of the value of $a_0$.

DETAILED DESCRIPTION OF THE INVENTION

Figure 1:
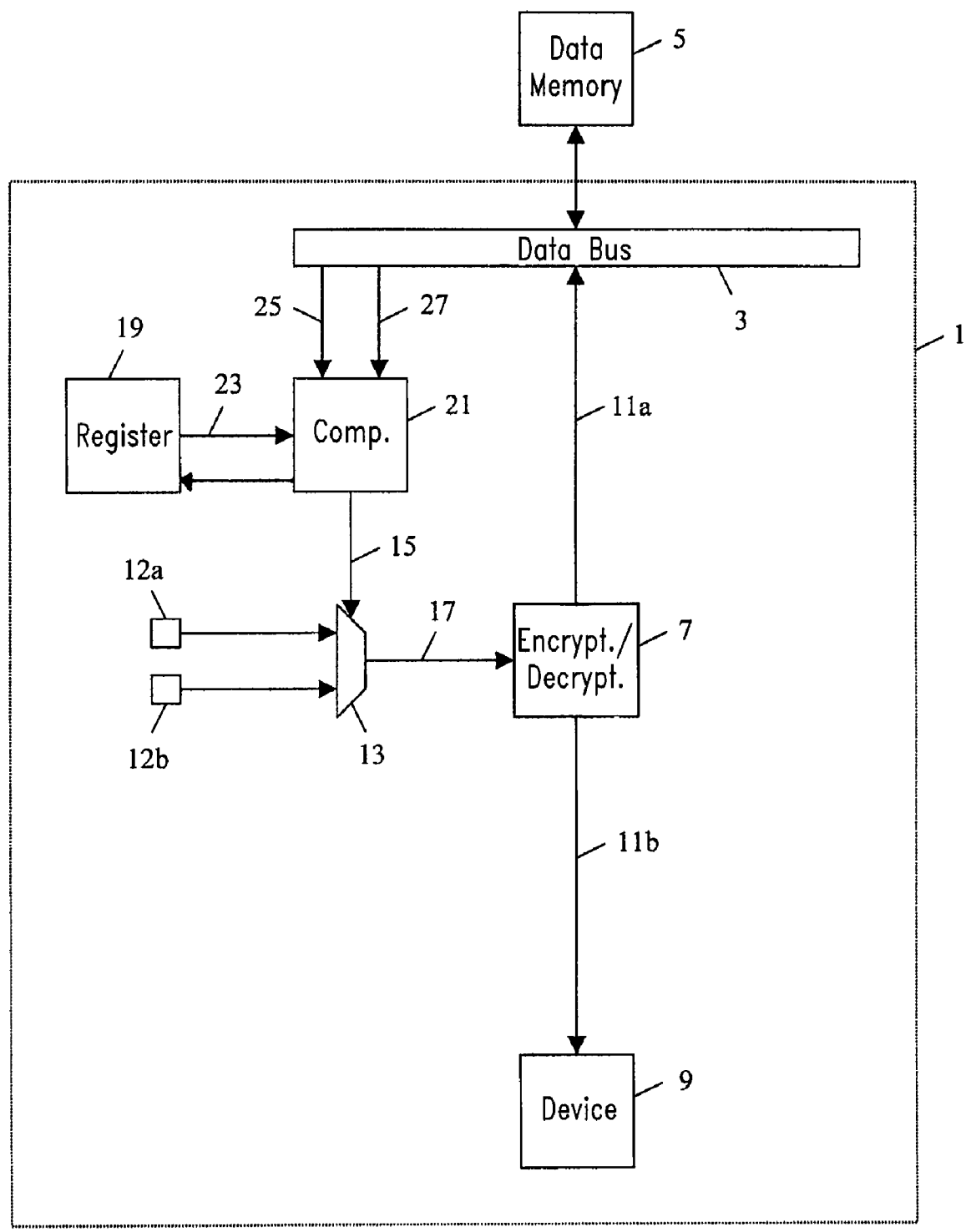
FIG. 1 is a schematic diagram of a circuit according to one embodiment of the invention.

FIG. 1 is a schematic diagram of a semiconductor integrated circuit according to one embodiment of the invention. The circuit 1 may be used in any system in which data is encrypted or decrypted using keys, but the circuit 1 is advantageously provided as a component of a set-top-box for use in a subscriber based pay-television system. In such systems, television data is broadcast and stored in an encrypted form to prevent unauthorized access to it. Authorized subscribers may gain access to the broadcast services by making an appropriate payment to a service provider. The set-top-boxes of authorized subscribers may then decrypt the data using secret keys obtained from the service provider.

The circuit 1 includes a data bus 3 which provides an interface between a data memory 5 and other parts of the system, and an encryption and decryption circuit 7 for encrypting and decrypting data. The terms encryption and decryption are intended to cover all forms of data encryption and decryption, including methods of data scrambling and data obfuscation. In one embodiment, the memory 5 is an external hard disc drive of a television set-top-box and the data stored in the memory 5 may be in the form of encrypted television broadcast data. The memory 5 could also be dynamic external random access memory (RAM). In one embodiment, the cryptographic circuit 7 is arranged to implement the advanced encryption standard (AES) algorithm. In another embodiment, the cryptographic circuit 7 is arranged to obfuscate data by performing a bitwise XOR function between the bits of a portion of data with the bits of a corresponding mask. Each mask is generated as a function of the memory address of the data portion according to a set of data that may be regarded as a key.

The circuit 1 is a monolithic device. This prevents hackers from intercepting data within the circuit, or from replacing components within the circuit in an attempt to gain access to confidential data.

Access to the data stored in the memory 5 may be requested by a device 9 on the circuit 1 such as an internal memory or processor. When a request is made by the device 9 to read data from the memory 5, signals are transmitted to the data bus 3 which cause specified data to be retrieved from the memory 5 and transmitted to the requesting device 9 via data pathway 11. When a request is made by the device 9 to write data to the memory 5, the data is transmitted from the device 9 to the data bus 3 via data pathway 11. Signals received by the data bus 3 then cause the data to be stored at a specified location in the memory 5.

Since the memory 5 is an external device that is not part of the monolithic circuit 1, this component is insecure and vulnerable to hacking. To prevent unauthorized access to data, confidential data is stored within the memory 5 in an encrypted form. Since the device 9 is part of the monolithic circuit 1, this component is secure. Accordingly, data transmitted to this component is in an unencrypted form. The data that flows along data pathway 11 passes through the cryptographic circuit 7 which is arranged to encrypt or decrypt the data. In particular, the cryptographic circuit 7 is arranged so that the data flowing along data pathway portion 11a is in an encrypted form, while data flowing along data pathway portion 11b is in an unencrypted form. This ensures that data stored within the memory 5 is always stored in an encrypted form while data received by the device 9 is in an unencrypted form.

The cryptographic circuit 7 encrypts or decrypts data according to a key that is input into the cryptographic circuit 7. The cryptographic circuit 7 encrypts or decrypts data using a specified key that is selected from a pair of keys, A and B, stored in key memories 12a and 12b respectively. The selection of key A or key B for use in the encryption of decryption process is made according to the address of the memory 5 to or from which the data is being written or read.

The memory 5 is partitioned into two distinct contiguous regions, and the memory address of the boundary separating the two regions may be specified by a variable, $a_0$. The variable $a_0$ may be a pointer corresponding to a true memory address, or may specify a virtual memory address, an offset, or any other indication of a location within the memory 5. The term memory address is intended to cover any of these possibilities.

In the preferred embodiment, the data that is stored in the upper region (having memory addresses greater than $a_0$) is encrypted using key A, while the data that is stored in the lower region (having memory addresses smaller than $a_0$) is encrypted using key B. Data that is stored on the boundary address, $a_0$, is encrypted using key A. Accordingly, if a portion of data is being read from a memory location having a particular address 'a', then key A is used to decrypt the data if $a \geq a_0$, and key B is used if $a < a_0$. However, for data write operations, a different set of conditions are used. If data is written to a memory location having a particular address a, then key A is used to encrypt the data if $a \geq a_0+1$, and key B is used if $a < a_0+1$. It can be seen that when data is written to the boundary address, $a_0$, the data is encrypted using a different key to the one used to read the data at that address. This has the effect of increasing, by one unit, the boundary address that separates data that has been encrypted using key A with data that has been encrypted using key B. Therefore, the value of $a_0$ has been incremented by one.

During operation of the system, a multiplexer (MUX) 13 receives the values of the two keys, A and B, as inputs, and is arranged to output a selected one of these keys according to the switching state of the MUX 13. The switching state of the MUX 13 is controlled by a signal on data pathway 15. The selected key output from the MUX 13 is transmitted to the cryptographic circuit 7 via data pathway 17. The cryptographic circuit 7 then uses the selected key to encrypt or decrypt data.

A store such as register 19 is provided to store the current value of $a_0$. The register 19 is modifiable, for example so that the stored value of $a_0$ may be incremented or set to zero.

When a data access to or from the memory 5 takes place, a comparator 21 receives the current value of $a_0$ from register 19 via data pathway 23. Comparator 21 also receives two data access signals transmitted from the data bus 3 via data pathways 25 and 27. The first data access signal, transmitted along data pathway 25, is the memory address, a, of the data currently being accessed by the device 9. The second data access signal, transmitted along data pathway 27, provides an indication of whether the data access is a read or write operation. The comparator 21 is arranged to compare the value of $a_0$ with the value of a and to output a signal on data pathway 15 to control the switching state of the MUX 13 accordingly. For example, if the comparator 21 receives a signal from the data bus 3 indicating that data is being read from the memory 5, and determines that the memory address being accessed is greater than or equal to the value of $a_0$, then a signal is generated to set the switching state of the MUX 13 so that the value of key A is selected and input into the cryptographic circuit 7. The data being read is transmitted along data pathway 11 through the cryptographic circuit 7 which decrypts the data using the selected key A before it is transmitted to the requesting device 9.

If the comparator 21 receives a signal from the data bus 3 indicating that data is being written to the memory 5, and determines that the memory address being accessed is equal to $a_0$, then a signal is generated to set the switching state of the MUX 13 so that the value of key B is selected and input into the cryptographic circuit 7. The data being written is transmitted along data pathway 5 through the cryptographic circuit 7 which encrypts the data using the selected key B before it is transmitted to the memory 5. In this specific case, the result of the data write operation is that the boundary separating the data that is encrypted using key A with the data that is encrypted using key B has moved up to the next highest memory address. Accordingly, the comparator 21 transmits a signal to register 19 which causes the value of $a_0$ stored in the register 19 to increment by one.

Figure 2A:
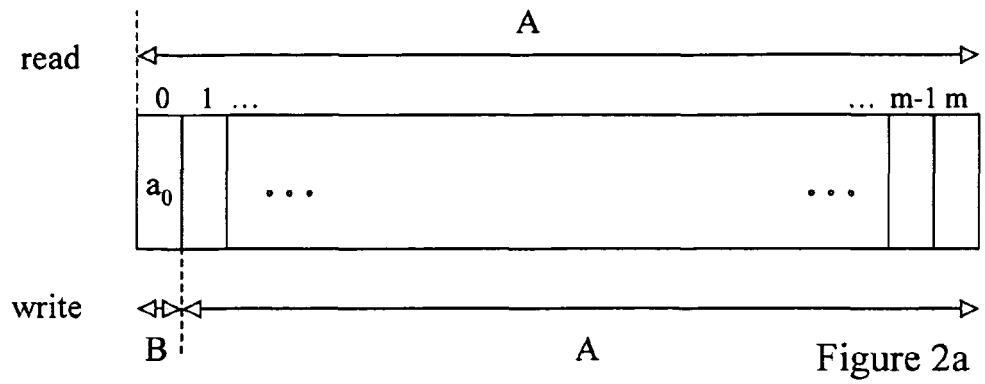
FIGS. 2A-2D is a schematic diagram of the key update process provided by one embodiment of the invention.
Figure 2B:
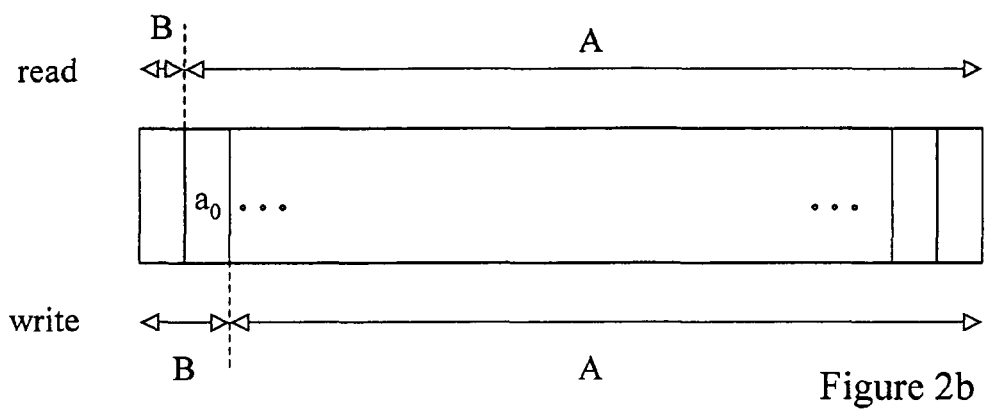
Figure 2C:
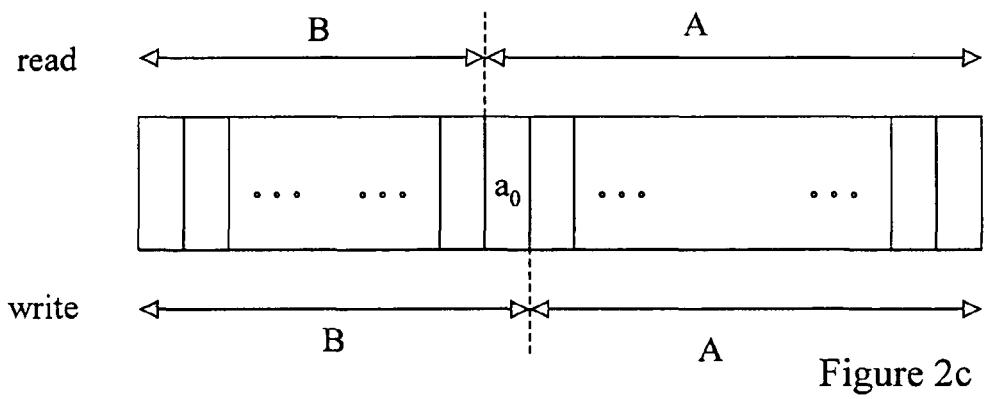
Figure 2D:
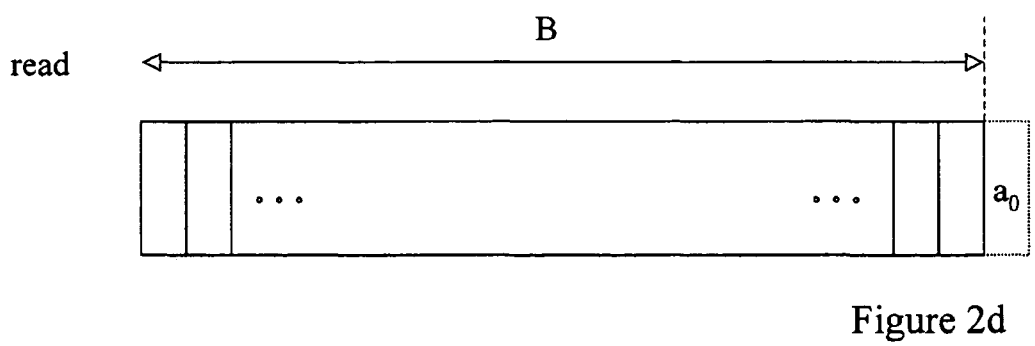

Initially, the value of $a_0$ is set to zero. At this stage, any data that is already stored in the memory 5 is encrypted using key A since the upper region occupies the entire memory 5 as shown in FIG. 2a. Consequently, all data that is read from the memory 5 is decrypted using key A. Also, most data that is written to the memory 5 will be encrypted using key A. However, when data is written to the boundary address $a_0$, this causes the boundary to shift and the value of $a_0$ to increase as shown in FIG. 2b. As this process continues, the value of $a_0$ will increase gradually, and after a time, the value of $a_0$ will point to some intermediate address of the memory 5 as shown in FIG. 2c. At this stage, some of the data is stored in the memory 5 encrypted using key A, while the other data is stored encrypted using key B. The key used to encrypt data has thus been updated from key A to key B for a portion of the data. As the process continues yet further, the value of $a_0$ eventually exceeds the highest address, m, of the memory 5 as shown in FIG. 2d. At this stage, all data stored in the memory 5 is encrypted using key B since the lower region occupies the entire memory 5. The key used to encrypt data has thus been updated from key A to key B for all data stored in the memory 5.

At this point, the value of $a_0$ is reset back to zero, a new key A takes the value of key B, a new key B is generated, and the above process is repeated with the new key A and new key B taking the place of old key A and old key B. Each time the value of $a_0$ is incremented, the comparator 21 compares the incremented value of $a_0$ with the maximum address, m, of the memory 5, for example also stored in register 19. If $a_0$ is greater than m then the content of the register 19 is reset to a value of zero by the comparator 21. The contents of key memory 12b are transmitted to and stored in key memory 12a. A new key is then generated by any suitable key generator and stored in key memory 12b. At this stage, all data currently stored in the memory 5 is encrypted using new key A (which is the same as old key B), and the state of the system has returned to that shown in FIG. 2a. As the above process is repeated, the value of $a_0$ will gradually increase once again, and the new key A used to encrypt the data stored in the memory 5 will be gradually replaced by the new key B.

It can be seen that with the method and apparatus described above, the key used to encrypt and decrypt data is replaced gradually as the value of $a_0$ sweeps across the memory 5. The replacement is gradual in the sense that each time a new key is generated, this new key replaces the last key for gradually increasing regions of memory 5 until the old key has been replaced by the new key for the entire memory 5. Each time the value of $a_0$ makes a complete sweep across the memory 5 then a key has been fully updated. The above process may therefore be called a key update process.

A problem with the method described above is that if a portion of the memory 5 is never used, the value of $a_0$ will become stuck at the lowest memory address of that portion since then no data would ever be written to the boundary address. In order to solve this problem, a 'kicker' process may be provided. The value of $a_0$ stored in the register 19 is continuously monitored. If this value does not change within a predetermined period of time then the kicker process is activated. For example, in one embodiment, a monitor unit (not shown) comprising two memories, a clock and a comparator is arranged to extract the current value of $a_0$ stored in the register 19 and store this value in the first memory of the monitor unit. After a predetermined number of clock cycles, the value of $a_0$ is extracted again and stored in the second memory of the monitor unit. The comparator of the monitor unit then compares the values in the first and second memories and transmits a kicker signal to the data bus 3 to activate the kicker process if the two values are equal.

During the kicker process, the kicker signal causes the data bus 3 to read data from the memory address $a_0$, and to write the same data back to the same memory address. Since data at this address is initially stored encrypted using key A, when the data is read, key A is used to decrypt the data. Then, when the data is written back, key B will be used to encrypt the data, since the data is being written to the boundary address $a_0$. This process causes the value of $a_0$ to be increased by one unit. In other words, the kicker process may be thought of as an 'artificial' data read/write operation which stimulates the standard process described above which increments the value of $a_0$.

In the embodiments described above, a single memory 5 is used. However, in alternative embodiments, a plurality of memories spaces may be used. These may be provided by separate devices, or they may be provided by distinct memory spaces in a single device. For example, in one embodiment, the memory 5 is separated into a plurality of memory spaces. In this embodiment, a store is provided to store a list of start and end memory addresses of each memory space. The key update process described above may be applied to all, some, or none of the memory spaces. For example, the memory 5 may be separated into secure and non-secure spaces, and the key update process may be applied only to the secure spaces. In this case, secure accesses to insecure spaces may be blocked. Similarly, the writing of non-secure data to a secure space is preferably avoided.

In embodiments in which multiple memory spaces are provided for, the key update mechanism may be applied independently to each of the separate memory spaces. The same sets of keys may be used for each memory space, or alternatively, different sets of keys could be used for each memory space. For example in one memory space, key A could be gradually replaced by key B, while in a different memory space, a key C could be gradually replaced with a key D. In one embodiment, the register 19 is replaced by a series of registers, one for each memory space to which the key update mechanism is being applied. Each register stores a separate value of $a_0$ for a corresponding memory space which may be incremented and reset independently from the other values. The value of $a_0$ for each memory space is initially set to the minimum value of $a_0$ (being the start memory address of that space). To determine when $a_0$ for a particular memory space has exceeded the maximum value (being the end memory address of that space), when the value of $a_0$ is incremented, the incremented value is compared with the relevant end memory address stored in the store. When the value of $a_0$ exceeds the end memory address, the value is reset to the start memory address.

When the value of $a_0$ for a particular memory space has exceeded the corresponding end memory address, then that region is marked as complete. For example, in one embodiment, a store is arranged to store a series of completion flags, each one corresponding to a different memory space. When $a_0$ for a particular memory space has exceeded the maximum value, the corresponding completion flag may be set. The value of $a_0$ for each and every memory space is reset back to the minimum value only when all the memory spaces have been marked as completed. At this point, the completion flags for each memory space may be cleared to allow the key update process to repeat.

If a memory space is marked as completed, the kicker process ignores that particular memory space until the memory space is no longer marked as completed. This prevents data from being written to invalid addresses outside the memory space.

In the embodiments described above, the pointer $a_0$ is incremented when data is written to the address pointed to by $a_0$. However, the scope of the invention encompasses devices in which the value of $a_0$ is incremented in other ways. For example, in an alternative embodiment, the value of $a_0$ may be periodically incremented regardless of which memory addresses data is written to. In another embodiment, the value of $a_0$ is incremented at a rate which depends on the rate of data access to and/or from the memory 5 or to specific regions of the memory 5. For example, the rate of increase of $a_0$ may be proportional to the rate at which data is written to the memory 5. This ensures that if data access to or from the memory 5 is high, the encryption and decryption keys are updated more regularly than if the rate of data access were lower. In each of these embodiments, the incrementation of $a_0$ is controlled by a host CPU (not shown).

It will be clear to the skilled person that the invention also covers embodiments in which the value of $a_0$ is decremented, or is varied in a more complicated manner. For example, in some embodiments, $a_0$ may be increased or decreased by amounts greater than one. The increases or decreases in $a_0$ may also vary in size and direction.

Whatever process is used to increase or decrease the value of $a_0$, the process should always ensure that $a_0$ represents the true boundary between data that is encrypted using one key and data that is encrypted using another key. Whenever $a_0$ is varied, a process should take place to maintain a correspondence between the value of $a_0$ and the true boundary. For example, any data that falls from one side of the boundary to the other due to a change in $a_0$ should be encrypted using the appropriate key, being decrypted with the other key first if necessary. If the value of $a_0$ is increased or decreased by a value greater than one, then multiple bytes of data, having addresses between the old and new values of $a_0$, may need to be re-encrypted using a different key. Conversely, if data is written to the memory 5 using a particular key, then if this process causes a change in the boundary, the value of $a_0$ should be modified accordingly.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. A semiconductor integrated circuit for updating encryption or decryption keys used to encrypt or decrypt data in a secure system in which data is stored in an encrypted form in a memory, the circuit comprising:

a device;

a store for storing a boundary address defining a boundary separating at least a portion of the memory into a first region and a second region;

a cryptographic circuit for encrypting or decrypting data flowing between the memory and the device;

a key selector arranged to select either a first key or a second key and provide the selected key to the cryptographic circuit, wherein the selected key is selected such that data transferred between the device and the first region of the memory is encrypted or decrypted by the cryptographic circuit using the first key, and data transferred between the device and the second region of the memory is encrypted or decrypted by the cryptographic circuit using the second key, and updating means for incrementing or decrementing the boundary address in response to data being written to the boundary address;

wherein the boundary address is variable between a minimum value and a maximum value and wherein the updating means set the boundary address to the minimum value if the boundary address exceeds the maximum value, set the first key to the value of the second key, and generate a new second key.

2. The semiconductor integrated circuit of claim 1 wherein the first region comprises memory addresses within the portion of the memory that are greater than or equal to the boundary address, and the second region comprises memory addresses within the portion of the memory that are less than the boundary address.

3. The semiconductor integrated circuit of claim 1, wherein the updating means increment the boundary address by one unit in response to data being written to the boundary address, and wherein the data written to the boundary address is encrypted using the second key.

4. The semiconductor integrated circuit of claim 1 wherein the first region comprises memory addresses within the portion of the memory that are greater than the boundary address, and the second region comprises memory addresses within the portion of the memory that are less than or equal to the boundary address.

5. The semiconductor integrated circuit of claim 4 wherein the updating means decrement the boundary address by one unit if data is written to the boundary address, and wherein the cryptographic circuit encrypts the data written to the boundary address using the first key.

6. The semiconductor integrated circuit of claim 1 wherein the key selector is a multiplexer arranged to receive the first and second keys as inputs and to output the selected key according to a switching state of the multiplexer.

7. The semiconductor integrated circuit of claim 6, wherein the store is modifiable, the circuit further comprising:

a comparator arranged to receive signals indicating a value of the boundary address, a memory address of a data access submitted by the device, and whether the data access is a read or write operation, and to generate a selection signal to control the switching state of the multiplexer accordingly.

8. The semiconductor integrated circuit of claim 7 wherein the comparator is arranged to generate the selection signal to set the switching state of the multiplexer according to the following rules:

select the first key if the data access is a read operation and the memory address being accessed is greater than or equal to the boundary address;

select the second key if the data access is a read operation and the memory address being accessed is less than the boundary address;

select the first key if the data access is a write operation and the memory address being accessed is greater than the boundary address; and select the second key if the data access is a write operation and the memory address being accessed is less than or equal to the boundary address.

9. The semiconductor integrated circuit of claim 7 wherein the comparator is arranged to generate the selection signal to set the switching state of the multiplexer according to the following rules:

select the first key if the data access is a read operation and the memory address being accessed is greater than the boundary address;

select the second key if the data access is a read operation and the memory address being accessed is less than or equal to the boundary address;

select the first key if the data access is a write operation and the memory address being accessed is greater than or equal to the boundary address; and select the second key if the data access is a write operation and the memory address being accessed is less than the boundary address.

10. The semiconductor integrated circuit of claim 1 wherein the boundary address minimum value is a start memory address of a portion of the memory, and the boundary address maximum value is an end memory address of the portion of the memory.

11. The semiconductor integrated circuit of claim 1 wherein the boundary address minimum value is zero and the boundary address maximum value is a highest address of the memory.

12. The semiconductor integrated circuit of claim 1 wherein the boundary address is increased or decreased at a constant rate.

13. The semiconductor integrated circuit of claim 1 wherein the boundary address is increased or decreases according to a rate at which data access occurs to or from the memory.

14. The semiconductor integrated circuit of claim 1 wherein the circuit is a monolithic device.

15. The semiconductor integrated circuit of claim 1, further comprising one or more storage units configured to store the first and second keys, wherein the key selector is configured to select the first key in response to an access request directed to the first region and select the second key in response to an access request directed to the second region.

16. A semiconductor integrated circuit for updating encryption or decryption keys used to encrypt or decrypt data in a secure system in which data is stored in an encrypted form in a memory, the circuit comprising:

a device;

a store for storing a boundary address defining a boundary separating at least a portion of the memory into a first region and a second region;

a cryptographic circuit for encrypting or decrypting data flowing between the memory and the device;

a key selector arranged to select either a first key or a second key and provide the selected key to the cryptographic circuit, wherein the selected key is selected such that data transferred between the device and the first region of the memory is encrypted or decrypted by the cryptographic circuit using the first key, and data transferred between the device and the second region of the memory is encrypted or decrypted by the cryptographic circuit using the second key;

updating means for incrementing or decrementing the boundary address in response to data being written to the boundary address, wherein the boundary address is variable between a minimum value and a maximum value, wherein the updating means increment the boundary address by one unit in response to data being written to the boundary address, and wherein the data written to the boundary address is encrypted using the second key; and kicker means for, if no data has been written to the boundary address for a threshold period of time, decrypting the data that is stored on the boundary address using the first key, re-encrypting the decrypted data using the second key, writing the re-encrypted data back to the boundary address, and incrementing the boundary address by one unit.

17. A semiconductor integrated circuit for updating encryption or decryption keys used to encrypt or decrypt data in a secure system in which data is stored in an encrypted form in a memory, the circuit comprising:

a device;

a store for storing a boundary address defining a boundary separating at least a portion of the memory into a first region and a second region;

a cryptographic circuit for encrypting or decrypting data flowing between the memory and the device;

a key selector arranged to select either a first key or a second key and provide the selected key to the cryptographic circuit, wherein the selected key is selected such that data transferred between the device and the first region of the memory is encrypted or decrypted by the cryptographic circuit using the first key, and data transferred between the device and the second region of the memory is encrypted or decrypted by the cryptographic circuit using the second key;

updating means for incrementing or decrementing the boundary address in response to data being written to the boundary address, wherein the boundary address is variable between a minimum value and a maximum value, wherein the first region comprises memory addresses within the portion of the memory that are greater than the boundary address, and the second region comprises memory addresses within the portion of the memory that are less than or equal to the boundary address, wherein the updating means decrement the boundary address by one unit if data is written to the boundary address, and wherein the cryptographic circuit encrypts the data written to the boundary address using the first key; and kicker means for, if no data has been written to the boundary address for a threshold period of time, decrypting the data that is stored on the boundary address using the second key, re-encrypting the decrypted data using the first key, writing the re-encrypted data back to the boundary address, and decrementing the boundary address by one unit.

18. A semiconductor integrated circuit for updating encryption or decryption keys used to encrypt or decrypt data in a secure system in which data is stored in an encrypted form in a memory, the circuit comprising:

a device;

a store for storing a boundary address defining a boundary separating at least a portion of the memory into a first region and a second region;

a cryptographic circuit for encrypting or decrypting data flowing between the memory and the device;

a key selector arranged to select either a first key or a second key and provide the selected key to the cryptographic circuit, wherein the selected key is selected such that data transferred between the device and the first region of the memory is encrypted or decrypted by the cryptographic circuit using the first key, and data transferred between the device and the second region of the memory is encrypted or decrypted by the cryptographic circuit using the second key; and updating means for incrementing or decrementing the boundary address in response to data being written to the boundary address, wherein the boundary address is variable between a minimum value and a maximum value, wherein the first region comprises memory addresses within the portion of the memory that are greater than the boundary address, and the second region comprises memory addresses within the portion of the memory that are less than or equal to the boundary address, and wherein the updating means set the boundary address to the maximum value if the boundary address falls below the minimum value, set the second key to the value of the first key, and generate a new first key.

19. A television set-top-box, comprising:

a memory that stores data in an encrypted form; and a semiconductor integrated circuit for updating encryption or decryption keys used to encrypt or decrypt data to or from the memory, the circuit including:

a device;

a store for storing a boundary address defining a boundary separating at least a portion of the memory into a first region and a second region;

a cryptographic circuit for encrypting or decrypting data flowing between the memory and the device;

a key selector arranged to select either a first key or a second key and provide the selected key to the cryptographic circuit, wherein the selected key is selected such that data transferred between the device and the first region of the memory is encrypted or decrypted by the cryptographic circuit using the first key, and data transferred between the device and the second region of the memory is encrypted or decrypted by the cryptographic circuit using the second key; and updating means for incrementing or decrementing the boundary address in response to data being written to the boundary address;

wherein the boundary address is variable between a minimum value and a maximum value, and wherein the updating means set the boundary address to the minimum value if the boundary address exceeds the maximum value, set the first key to the value of the second key, and generate a new second key.

20. The set-top-box of claim 19, wherein the circuit includes updating means for incrementing or decrementing the boundary address if data is written to the boundary address.

21. The set-top-box of claim 20 wherein the first region comprises memory addresses within the portion of the memory that are greater than or equal to the boundary address, and the second region comprises memory addresses within the portion of the memory that are less than the boundary address.

22. The set-top-box of claim 21, wherein the updating means increment the boundary address by one unit if data is written to the boundary address, and wherein the data written to the boundary address is encrypted using the second key.

23. The set-top box of claim 19, wherein the integrated circuit includes one or more storage units configured to store the first and second keys, wherein the key selector is configured to select the first key in response to an access request directed to the first region and select the second key in response to an access request directed to the second region.

24. A television set-top-box, comprising:
a memory that stores data in an encrypted form; and
a semiconductor integrated circuit for updating encryption or decryption keys used to encrypt or decrypt data to or from the memory, the circuit including:
  a device;
  a store for storing a boundary address defining a boundary separating at least a portion of the memory into a first region and a second region;
  a cryptographic circuit for encrypting or decrypting data flowing between the memory and the device;
  a key selector arranged to select either a first key or a second key and provide the selected key to the cryptographic circuit, wherein the selected key is selected such that data transferred between the device and the first region of the memory is encrypted or decrypted by the cryptographic circuit using the first key, and data transferred between the device and the second region of the memory is encrypted or decrypted by the cryptographic circuit using the second key, wherein the boundary address is variable between a minimum value and a maximum value;
  updating means for incrementing or decrementing the boundary address if data is written to the boundary address; and
  kicker means for, if no data has been written to the boundary address for a threshold period of time, decrypting the data that is stored on the boundary address using the first key, re-encrypting the decrypted data using the second key, writing the re-encrypted data back to the boundary address, and incrementing the boundary address by one unit.

25. A method for a secure system in which data is stored in an encrypted form in a memory, the method comprising:
storing a boundary address defining a boundary separating at least a portion of the memory into a first region and a second region;
encrypting or decrypting data flowing between the memory and a device using a selected key wherein the data transferred between the device and the first region of the memory is encrypted or decrypted using a first key, and data transferred between the device and the second region of the memory is encrypted or decrypted using a second key; and
varying the boundary address between a minimum value and a maximum value and wherein the step of varying the boundary address comprises the step of setting the boundary address to the minimum value if the boundary address exceeds the maximum value and wherein the first key takes the value of the second key and a new second key is generated.

26. The method of claim 25 wherein the first region comprises memory addresses within the portion of the memory that are greater than or equal to the boundary address, and the second region comprises memory addresses within the portion of the memory that are less than the boundary address.

27. The method of claim 26 wherein the step of varying the boundary address comprises the step of incrementing the boundary address by one unit if data is written to the boundary address, and wherein the data written to the boundary address is encrypted using the second key.

28. The method of claim 25 wherein the first region comprises memory addresses within the portion of the memory that are greater than the boundary address, and the second region comprises memory addresses within the portion of the memory that are less than or equal to the boundary address.

29. The method of claim 28 wherein the step of varying the boundary address comprises the step of decrementing the boundary address by one unit if data is written to the boundary address, and wherein the data written to the boundary address is encrypted using the first key.

30. The method of claim 25 wherein using a selected key comprises the steps of: determining the value of the boundary address and the memory address of data currently being accessed; determining whether the data access is a read or write operation; and selecting either the first key or the second key accordingly.

31. The method of claim 30 wherein the step of selecting either the first key or the second key comprises the step of selecting either the first key or the second key according to the following rules:
  select the first key if the data access is a read operation and the memory address being accessed is greater than or equal to the boundary address;
  select the second key if the data access is a read operation and the memory address being accessed is less than the boundary address;
  select the first key if the data access is a write operation and the memory address being accessed is greater than the boundary address;
  select the second key if the data access is a write operation and the memory address being accessed is less than or equal to the boundary address.

32. The method of claim 30 wherein the step of selecting either the first key or the second key comprises the step of selecting either the first key or the second key according to the following rules:
  select the first key if the data access is a read operation and the memory address being accessed is greater than the boundary address;
  select the second key if the data access is a read operation and the memory address being accessed is less than or equal to the boundary address;
  select the first key if the data access is a write operation and the memory address being accessed is greater than or equal to the boundary address;
  select the second key if the data access is a write operation and the memory address being accessed is less than the boundary address.

33. The method of claim 25 wherein the boundary address minimum value is a start memory address of a portion of the memory, and the boundary address maximum value is an end memory address of the portion of the memory.

34. The method of claim 25 wherein the boundary address minimum value is zero and the boundary address maximum value is a highest address of the memory.

35. The method of claim 25 wherein the step of varying the boundary address comprises the step of increasing or decreasing the boundary address according to a rate at which data access occurs to or from the memory.

36. The method of claim 25 wherein the step of varying the boundary address comprises the step of increasing or decreasing the boundary address at a constant rate.

37. The method of claim 25, further comprising storing the first and second keys in one or more storage units, wherein the selecting includes selecting the first key in response to an access request directed to the first region and select the second key in response to an access request directed to the second region.

38. A method for a secure system in which data is stored in an encrypted form in a memory, the method comprising:

storing a boundary address defining a boundary separating at least a portion of the memory into a first region and a second region;

encrypting or decrypting data flowing between the memory and a device using a selected key wherein the data transferred between the device and the first region of the memory is encrypted or decrypted using a first key, and data transferred between the device and the second region of the memory is encrypted or decrypted using a second key; and varying the boundary address between a minimum value and a maximum value, wherein the step of varying the boundary address comprises the step of incrementing or decrementing the boundary address if data is written to the boundary address, wherein the first region comprises memory addresses within the portion of the memory that are greater than or equal to the boundary address, and the second region comprises memory addresses within the portion of the memory that are less than the boundary address, and wherein the step of varying the boundary address comprises the step of incrementing the boundary address by one unit if data is written to the boundary address, and wherein the data written to the boundary address is encrypted using the second key; and if no data has been written to the boundary address for a predetermined period of time, decrypting the data that is stored on the boundary address using the first key; writing back the data to the boundary address re-encrypted using the second key; and incrementing the boundary address by one unit.

39. A method for a secure system in which data is stored in an encrypted form in a memory, the method comprising:

storing a boundary address defining a boundary separating at least a portion of the memory into a first region and a second region;

encrypting or decrypting data flowing between the memory and a device using a selected key wherein the data transferred between the device and the first region of the memory is encrypted or decrypted using a first key, and data transferred between the device and the second region of the memory is encrypted or decrypted using a second key; and varying the boundary address between a minimum value and a maximum value, wherein the step of varying the boundary address comprises the step of incrementing or decrementing the boundary address if data is written to the boundary address, wherein the first region comprises memory addresses within the portion of the memory that are greater than the boundary address, and the second region comprises memory addresses within the portion of the memory that are less than or equal to the boundary address, wherein the step of varying the boundary address comprises the step of decrementing the boundary address by one unit if data is written to the boundary address, and wherein the data written to the boundary address is encrypted using the first key; and if no data has been written to the boundary address for a predetermined period of time, decrypting the data that is stored on the boundary address using the second key; writing back the data to the boundary address re-encrypted using the first key; and decrementing the boundary address by one unit.

40. A method for a secure system in which data is stored in an encrypted form in a memory, the method comprising:

storing a boundary address defining a boundary separating at least a portion of the memory into a first region and a second region;

encrypting or decrypting data flowing between the memory and a device using a selected key wherein the data transferred between the device and the first region of the memory is encrypted or decrypted using a first key, and data transferred between the device and the second region of the memory is encrypted or decrypted using a second key; and varying the boundary address between a minimum value and a maximum value, wherein the step of varying the boundary address comprises the step of incrementing or decrementing the boundary address if data is written to the boundary address, wherein the first region comprises memory addresses within the portion of the memory that are greater than the boundary address, and the second region comprises memory addresses within the portion of the memory that are less than or equal to the boundary address, wherein the step of varying the boundary address comprises the step of setting the boundary address to the maximum value if the boundary address falls below the minimum value, and wherein the second key takes the value of the first key and a new first key is generated.

41. A semiconductor integrated circuit for use with a memory that stores encrypted data, comprising:

a storage unit configured to store a boundary address defining a boundary separating at least a portion of the memory into a first region and a second region;

a key selector configured to select either a first key or a second key and output the selected key;

a cryptographic circuit configured to receive the selected key, encrypt or decrypt data to or from the first region of the memory if the selected key is the first key, and encrypt or decrypt data to or from the second region of the memory if the selected key is the second key; and a comparator configured to compare the stored boundary address with an input address of an access request for accessing the memory, and change the boundary address in response to determining that the stored boundary address equals the input address and wherein the comparator is configured to set the boundary address to a minimum value if the boundary address exceeds a maximum value, set the first key to a value of the second key, and generate a new second key.

42. The semiconductor integrated circuit of claim 41, wherein the comparator is configured to determine whether the access request is a write request, and increment the boundary address by one unit in response to determining that the input address equals to the boundary address and the access request is a write request.

43. A semiconductor integrated circuit for use with a memory that stores encrypted data, comprising:

a storage unit configured to store a boundary address defining a boundary separating at least a portion of the memory into a first region and a second region;

a key selector configured to select either a first key or a second key and output the selected key;

a cryptographic circuit configured to receive the selected key, encrypt or decrypt data to or from the first region of the memory if the selected key is the first key, and encrypt or decrypt data to or from the second region of the memory if the selected key is the second key; and a comparator configured to compare the stored boundary address with an input address of an access request for accessing the memory, and change the boundary address in response to determining that the stored boundary address equals the input address; and kicker means for, if no data has been written to the boundary address for a threshold period of time, decrypting the data that is stored on the boundary address using the first key, re-encrypting the decrypted data using the second key, writing the re-encrypted data back to the boundary address, and incrementing the boundary address by one unit.

* * * * *